US012393996B2

United States Patent
Noritake

(10) Patent No.: US 12,393,996 B2
(45) Date of Patent: Aug. 19, 2025

(54) OPERATION SYSTEM, OPERATION METHOD, AND PROGRAM OF MOBILE HYDROGEN STATION

(71) Applicant: TOYOTA JIDOSHA KABUSHIKI KAISHA, Toyota (JP)

(72) Inventor: Kazuto Noritake, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 685 days.

(21) Appl. No.: 17/664,690

(22) Filed: May 24, 2022

(65) Prior Publication Data

US 2022/0383430 A1  Dec. 1, 2022

(30) Foreign Application Priority Data

Jun. 1, 2021 (JP) .................................. 2021-092297

(51) Int. Cl.
*G06Q 50/06* (2024.01)
*B60L 53/68* (2019.01)
*G06Q 10/0631* (2023.01)

(52) U.S. Cl.
CPC .............. *G06Q 50/06* (2013.01); *B60L 53/68* (2019.02); *G06Q 10/06312* (2013.01)

(58) Field of Classification Search
CPC .. G06Q 50/06; G06Q 10/06312; G06Q 10/20; B60L 53/68
See application file for complete search history.

(56) References Cited

U.S. PATENT DOCUMENTS

| 2004/0163731 | A1* | 8/2004 | Eichelberger | F17C 1/00 141/284 |
| 2017/0246960 | A1* | 8/2017 | Kim | B60L 53/305 |
| 2020/0097909 | A1* | 3/2020 | Todo | B60L 53/67 |
| 2022/0246955 | A1* | 8/2022 | Orihashi | B60L 53/68 |
| 2023/0116006 | A1* | 4/2023 | Cioffi | H01M 8/04753 141/1 |
| 2023/0126144 | A1* | 4/2023 | Seike | C01B 3/0015 705/332 |
| 2025/0058664 | A1* | 2/2025 | Raguse | B60L 53/62 |

FOREIGN PATENT DOCUMENTS

| JP | 2006-173068 A | 6/2008 |
| JP | 2008-197889 A | 8/2008 |
| JP | 2017-174153 A | 9/2017 |
| JP | 2017-194745 A | 10/2017 |

* cited by examiner

*Primary Examiner* — Nha T Nguyen
(74) *Attorney, Agent, or Firm* — Oblon, McClelland, Maier & Neustadt, L.L.P.

(57) ABSTRACT

An operation server operates a plurality of MSTs, and includes a reception unit that receives a charging request that specifies at least a charging date and time and a charging place, a planning unit that generates deployment plan information for the MSTs based on the charging request received by the reception unit, and a deployment unit that executes a deployment process for the MSTs based on the deployment plan information. When there are not two or more of the MSTs that are available at the charging date and time specified by the charging request, the reception unit rejects the charging request. When the MST that has been deployed or is scheduled to be deployed fails, the deployment unit executes the deployment process such that the MST that is available at the charging date and time assigned to the failed MST is deployed instead of the failed MST, among the MSTs.

15 Claims, 5 Drawing Sheets

FIG. 3

| CHARGING PLACE | CHARGING DATE AND TIME | | | | | |
|---|---|---|---|---|---|---|
| | AM, AUGUST 4, 2021 | PM, AUGUST 4, 2021 | AM, AUGUST 5, 2021 | PM, AUGUST 5, 2021 | AM, AUGUST 6, 2021 | PM, AUGUST 6, 2021 |
| PLACE 1 | 1 | 6 | | 10 | 17 | 12 |
| PLACE 2 | 20 | | 9 | 13 | 5 | |
| PLACE 3 | 15 | 19 | 4 | 2 | | 18 |
| PLACE 4 | | 3 | | 21 | | |
| PLACE 5 | 8 | 14 | | 16 | 7 | 11 |
| PLACE 6 | | | | | | |

FIG. 4

| MST No. | CHARGING DATE AND TIME | | | | | |
| --- | --- | --- | --- | --- | --- | --- |
| | AM, AUGUST 4, 2021 | PM, AUGUST 4, 2021 | AM, AUGUST 5, 2021 | PM, AUGUST 5, 2021 | AM, AUGUST 6, 2021 | PM, AUGUST 6, 2021 |
| 1 | PLACE 2 | PLACE 5 | PLACE 4 | PLACE 4 | PLACE 3 | PLACE 6 |
| 2 | PLACE 6 | PLACE 1 | PLACE 3 | PLACE 2 | PLACE 6 | |
| 3 | PLACE 4 | PLACE 6 | | PLACE 3 | PLACE 2 | |
| 4 | PLACE 3 | PLACE 4 | | PLACE 6 | | PLACE 1 |
| 5 | | | | | | PLACE 4 |

OPERATION SYSTEM, OPERATION METHOD, AND PROGRAM OF MOBILE HYDROGEN STATION

CROSS-REFERENCE TO RELATED APPLICATION

This application claims priority to Japanese Patent Application No. 2021-092297 filed on Jun. 1, 2021, incorporated herein by reference in its entirety.

BACKGROUND

1. Technical Field

The present disclosure relates to an operation system, an operation method, and a program of a mobile hydrogen station.

2. Description of Related Art

Japanese Unexamined Patent Application Publication No. 2017-194745 (JP 2017-194745 A) discloses an arrangement planning technique for a mobile hydrogen station for charging a hydrogen fuel tank of a vehicle such as a fuel cell electric vehicle (FCEV) with hydrogen. Specifically, JP 2017-194745 A points out that an effective operation of the mobile hydrogen station is difficult when the mobile hydrogen station is allocated at a hydrogen charging station specified by a user of the FCEV based on a reservation of the user. In consideration of the above, in JP 2017-194745 A, an allocation planning method of the mobile hydrogen station within a region including a plurality of areas includes (1) calculating an estimated hydrogen demand amount in each area at a predetermined time, and (2) determining the area to which the mobile hydrogen station is allocated and a time slot when the mobile hydrogen station is allocated in the area based on the estimated hydrogen demand amount in each area.

SUMMARY

At present, in areas where there are few stationary hydrogen stations, few mobile hydrogen stations are shared by a plurality of charging sites in a time-division manner. If one of the mobile hydrogen stations fails, a charging service at the scheduled charging site cannot be provided, and the user has to change the schedule and go to another charging site, which imposes a great time and financial burden on the user.

On the other hand, in JP 2017-194745 A, the allocation plan of the mobile hydrogen stations is created on assumption that the mobile hydrogen stations are free from failures. Therefore, the technique cannot handle the failure of the mobile hydrogen station.

It is an object of the present disclosure is to provide an operation technique capable of handling a failure of a mobile hydrogen station.

A first aspect of the present disclosure provides an operation system that operates a plurality of mobile hydrogen stations, and the operation system includes: a reception unit that receives a charging request that specifies at least a charging date and time and a charging place; a planning unit that generates deployment plan information for the mobile hydrogen stations based on the charging request received by the reception unit; and a deployment unit that executes a deployment process for the mobile hydrogen stations based on the deployment plan information. When there are not two or more of the mobile hydrogen stations that are available at the charging date and time specified by the charging request, the reception unit rejects the charging request. When the mobile hydrogen station that has been deployed or is scheduled to be deployed fails, the deployment unit executes the deployment process such that the mobile hydrogen station that is available at the charging date and time assigned to the failed mobile hydrogen station is deployed instead of the failed mobile hydrogen station, among the mobile hydrogen stations. With the configuration above, an operation technique capable of handling the failure of the mobile hydrogen station is realized.

Preferably, when the mobile hydrogen station that has been deployed fails and there are two or more of the mobile hydrogen stations on standby, the deployment unit executes the deployment process such that the mobile hydrogen station that is closest to the charging place assigned to the failed mobile hydrogen station is deployed instead of the failed mobile hydrogen station, among the mobile hydrogen stations on standby. With the configuration above, the deployment cost can be reduced.

Preferably, when the mobile hydrogen station that has been deployed fails and there are two or more of the mobile hydrogen stations on standby, the deployment unit executes the deployment process such that the mobile hydrogen station having a largest chargeable amount is deployed instead of the failed mobile hydrogen station, among the mobile hydrogen stations on standby. With the configuration above, the mobile hydrogen station having an abundant chargeable amount is deployed to the charging place assigned to the failed mobile hydrogen station.

Preferably, when the mobile hydrogen station that has been deployed fails and none of the mobile hydrogen stations is on standby, the deployment unit executes the deployment process such that the mobile hydrogen station that has been deployed at another charging place is also deployed at the charging place assigned to the failed mobile hydrogen station in a time-division manner. With the configuration above, the charging service at the charging place can be continued without canceling the charging request that has already been received.

Preferably, when the mobile hydrogen station scheduled to be deployed fails and there are two or more of the mobile hydrogen stations that are available at the charging date and time assigned to the failed mobile hydrogen station, the planning unit updates the deployment plan information such that the mobile hydrogen station that is closest to the charging place assigned to the failed mobile hydrogen station in time slots before and after the charging date and time assigned to the failed mobile hydrogen station is deployed instead of the failed mobile hydrogen station, among the mobile hydrogen stations that are available. With the configuration above, the deployment cost can be reduced.

Preferably, when the mobile hydrogen station scheduled to be deployed fails and none of the mobile hydrogen stations is available at the charging date and time assigned to the failed mobile hydrogen station, the planning unit updates the deployment plan information such that the mobile hydrogen station scheduled to be deployed at another charging place at the charging date and time is also deployed at the charging place assigned to the failed mobile hydrogen station in a time-division manner. With the configuration above, the charging service at the charging place can be continued without canceling the charging request that has already been received.

Preferably, the operation system further operates a stationary hydrogen station, and when the stationary hydrogen station fails, the deployment unit executes the deployment process such that the mobile hydrogen station on standby is deployed at a place of or near the stationary hydrogen station. With the configuration above, the charging service in the stationary hydrogen station can be continued.

A second aspect of the present disclosure provides an operation method for operating a plurality of mobile hydrogen stations, and the operation method includes: a reception step of receiving a charging request that specifies at least a charging date and time and a charging place; a planning step of generating deployment plan information for the mobile hydrogen stations based on the charging request received by the reception unit; and a deployment step of executing a deployment process for the mobile hydrogen stations based on the deployment plan information. In the reception step, when there are not two or more of the mobile hydrogen stations that are available at the charging date and time specified by the charging request, the charging request is rejected. In the deployment step, when the mobile hydrogen station that has been deployed or is scheduled to be deployed fails, the deployment process is executed such that the mobile hydrogen station that is available at the charging date and time assigned to the failed mobile hydrogen station is deployed instead of the failed mobile hydrogen station, among the mobile hydrogen stations. With the method above, an operation technique capable of handling the failure of the mobile hydrogen station is realized. Preferably, the present disclosure provides a program that causes a computer to function as the operation system above, or causes the computer to execute the operation method above.

According to the present disclosure, an operation technique of the mobile hydrogen station capable of handling the failure of the mobile hydrogen station is realized.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a diagram showing a charging date and time and a charging place of each charging request in a table format;

FIG. 4 is a diagram showing deployment plans in a table format;

DETAILED DESCRIPTION OF EMBODIMENTS

Hereinafter, an embodiment of the present disclosure will be described below with reference to FIGS. 1 to 7.

Figure 1:
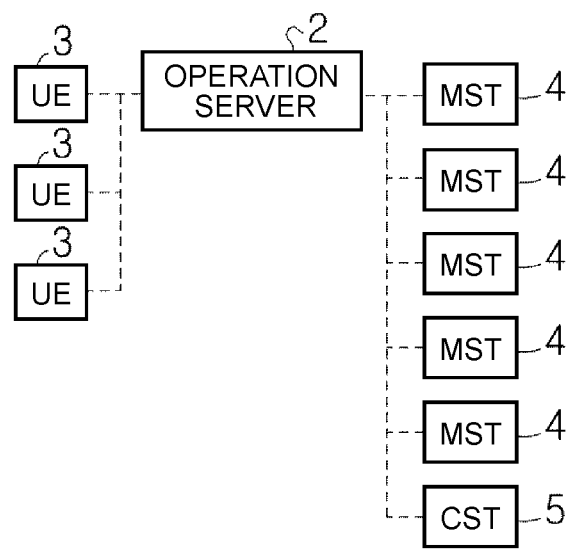
FIG. 1 is a schematic configuration diagram of a hydrogen supply system.

FIG. 1 shows a schematic configuration diagram of a hydrogen supply system 1. As shown in FIG. 1, the hydrogen supply system 1 includes an operation server 2, a plurality of user terminals 3 (hereinafter referred to as UEs 3), a plurality of mobile hydrogen stations 4 (hereinafter referred to as MSTs 4), and one stationary hydrogen station 5 (hereinafter referred to as CST 5).

The UEs 3 are configured to bidirectionally communicable with the operation server 2 via, for example, a wide area network (WAN). Similarly, the MSTs 4 and the CST 5 are configured to be bidirectionally communicable with the operation server 2 via, for example, WAN.

The UEs 3 are each a terminal used by a user who uses the hydrogen supply system 1, and is typically an information processing terminal owned by the user or a car navigation system mounted on a fuel cell electric vehicle owned by the user. The information processing terminal is typically a desktop personal computer (PC), a notebook personal computer, a tablet PC, a personal digital assistant (PDA), or a smartphone.

The MSTs 4 are each a mobile hydrogen station equipped with a hydrogen charging device on the bed of a movable truck. The hydrogen charging device typically includes a compressor, an accumulator, and a dispenser.

The CST 5 is a stationary hydrogen station equipped with a hydrogen charging device installed immovably. The CST 5 typically includes a compressor, an accumulator, and a dispenser. The CST 5 may be an on-site type stationary hydrogen station or an off-site type stationary hydrogen station. The on-site type stationary hydrogen station is a stationary hydrogen station that is provided with its own hydrogen production device. The off-site stationary hydrogen station is a stationary hydrogen station to which hydrogen is supplied by land from a centralized hydrogen production base.

The MSTs 4 and the CST 5 may be in a mother-daughter relationship. That is, the hydrogen charging devices of the MSTs 4 may be supplied with hydrogen at the CST 5.

The operation server 2 is a specific example of an operation system that operates the MSTs 4 and the CST 5. The operation server 2 receives a charging request from the UE 3 and deploys the MST 4 in response to the charging request.

The hydrogen supply system 1 is typically installed in each administrative division. Then, each MST 4 is temporarily deployed at any of a plurality of deployment places within the administrative division. The deployment places typically include existing gas stations, government service providers such as city halls, and large retail facilities such as supermarkets and consumer electronics stores. Each deployment place is a suitable location for deploying the MST 4 and generally requires pre-screening and pre-registration under relevant legislation. The hydrogen supply system 1 can flexibly meet the demand for hydrogen charging in the administrative division by operating the MSTs 4.

Figure 2:
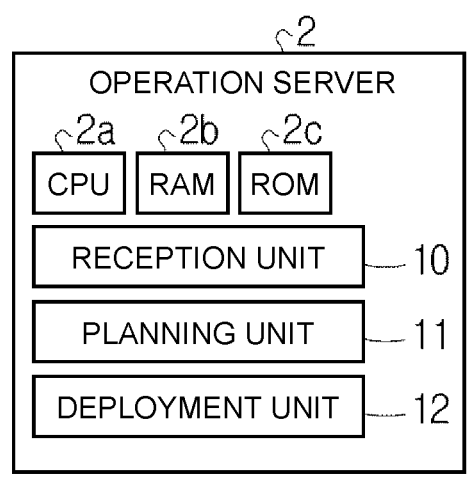
FIG. 2 is a functional block diagram of an operation server.

Next, the operation server 2 will be described with reference to FIGS. 2 to 4. FIG. 2 is a functional block diagram of the operation server 2. As shown in FIG. 2, the operation server 2 includes a central processing unit (CPU) 2a as a central arithmetic processor, a random access memory (RAM) 2b that is readable and writable, and a read-only memory (ROM) 2c that is read-only. Then, the CPU 2a reads out and executes the control program stored in the ROM 2c, whereby the control program causes the hardware such as the CPU 2a to function as a reception unit 10, a planning unit 11, and a deployment unit 12.

The reception unit 10 receives a charging request from each UE 3. The charging request is information that specifies at least a charging date and time and a charging place. The charging request may be information that further specifies a charging amount.

The charging date and time is a date and time when the user who corresponds to the UE 3 and owns the fuel cell electric vehicle desires to charge the vehicle with hydrogen. In the present embodiment, the charging date and time includes a date on which charging is desired and a time slot in which charging is desired. The time slot in which charging is desired can typically be expressed as before noon or afternoon. However, instead of this, the time slot in which charging is desired may be expressed by hours and minutes. Further, in the present embodiment, the user desires to charge the fuel cell electric vehicle with hydrogen. However, instead of this, the user may desire to charge the so-called hydrogen vehicle with hydrogen. Here, the fuel cell electric vehicle is a vehicle that uses hydrogen in the hydrogen fuel tank to generate electricity and uses the power to drive a motor. Further, the hydrogen vehicle is a vehicle that uses hydrogen in the hydrogen fuel tank as a power source through combustion of hydrogen in the hydrogen fuel tank in an engine such as a reciprocating engine or a rotary engine.

The charging place is a place where the user who corresponds to the UE 3 and owns the fuel cell electric vehicle desires to charge the vehicle with hydrogen. That is, the charging place is any of the deployment places in the administrative division assigned to the hydrogen supply system 1.

The charging amount is an amount of hydrogen that the user who corresponds to the UE 3 and owns the fuel cell electric vehicle desires to charge the vehicle with hydrogen. The charging request may be information that specifies the number of vehicles to be charged instead of specifying the charging amount. That is, when the charging request is information that specifies the number of vehicles to be charged instead of the charging amount, the reception unit 10 can calculate the charging amount by multiplying the number of vehicles to be charged by the known charging amount per vehicle.

The charging request according to the present embodiment is information that specifies the charging date and time and the charging place only.

The planning unit 11 generates deployment plan information for the MSTs 4 based on the charging request received by the reception unit 10.

Here, the description is made with reference to FIG. 3. FIG. 3 shows the charging date and time and the charging place of the charging request received by the reception unit 10 in a table format. For example, in FIG. 3, the number "1" is the charging request first received by the reception unit 10, and its charging date and time is "AM, Aug. 4, 2021", and the charging place is "Place 2". Similarly, the number "21" is the charging request that is the twenty-first request received by the reception unit 10, its charging date and time is "PM, Aug. 5, 2021", and the charging place is "Place 5". Note that, in the table shown in FIG. 3 is merely a table for explaining the contents of the charging requests received in order by the reception unit 10, and it is arbitrary whether the table shown in FIG. 3 is stored in a RAM 4b of the MST 4.

Next, the description will be made with reference to FIG. 4. FIG. 4 shows the deployment plan information generated by the planning unit 11 in a table format. The deployment plan information is information in which the charging date and time and the charging place are assigned to each MST 4. For example, the first MST 4 is planned to be deployed to "Place 2" in "AM, Aug. 4, 2021". Further, the fourth MST 4 is planned to be deployed to "Place 6" in "PM, Aug. 5, 2021". The planning unit 11 formulates the deployment plans for the MSTs 4 so as to satisfy the charging requests shown in FIG. 3, and generates the deployment plan information as a result of formulation.

Note that, in the deployment plan information shown in FIG. 4, the operating rate of the first MST 4 is the highest, and the operating rate of the fifth MST 4 is low. The planning unit 11 may generate the deployment plan information such that the operating rates of the MSTs 4 are as uniform as possible.

The deployment unit 12 executes a deployment process for the MSTs 4 based on the deployment plan information. Here, the deployment process means a process of deploying the MSTs 4 in accordance with the deployment plan information shown in FIG. 4.

The deployment process is, for example, transmitting the deployment plan information to the MSTs 4. In this case, the deployment plan information is output to the display provided in each MST 4. The operator of each MST 4 deploys each MST 4 with reference to the deployment plan information output to the display. Here, the operator is typically a driver.

Further, as the deployment process, for example, the deployment plan information is output to the display of the operation server 2. The operator of the operation server 2 issues a deployment command to each operator of the MST 4 based on the deployment plan information output to the display of the operation server 2.

If each MST 4 is mounted on a truck capable of autonomous traveling, the deployment process is to transmit a travel command to an autonomous driving control unit of each MST 4 based on the deployment plan information.

Then, when there are not two or more MSTs 4 that are available at the charging date and time specified by the charging request, the reception unit 10 rejects the charging request. For example, in FIG. 3, the charging request of No. 21 has the charging date and time as "PM, Aug. 5, 2021". With reference to the deployment plan information shown in FIG. 4, the MST 4 that can be newly deployed to "Place 5" in "PM, Aug. 5, 2021" specified by the charging request of No. 21, that is, the MST 4 that is available, is the fifth MST 4 only. This means that only one unit is available. Therefore, the reception unit 10 rejects the charging request of No. 21 shown in FIG. 3. Specifically, the reception unit 10 transmits a message indicating that the charging request is rejected to the UE 3 that is the transmission source of the charging request.

Note that, the reception unit 10 may suggest the UE 3 that is the transmission source of the charging request another charging date and time such as "AM, Aug. 5, 2021", or any one of or two or more of "Place 4", "Place 2", "Place 3", and "Place 6" that are the charging places at which the MSTs 4 are scheduled to be deployed in "PM, Aug. 5, 2021", instead of simply rejecting the charging request of No. 21 as described above.

As described above, the reception unit 10 does not schedule the deployment of at least one unit at all dates and times, and keeps the unit as a backup. With this configuration, even when the MST 4 that has been deployed or is scheduled to be deployed fails, the charging service planned to be provided by the failed MST 4 can be replaced by another MST 4.

That is, when the MST 4 that has been deployed or is scheduled to be deployed fails, the deployment unit 12 executes the deployment process such that the MST 4 that is available, among the MSTs 4, at the charging date and time assigned to the failed MST 4 is deployed instead of the failed MST 4.

For example, when the second MST 4 that has been deployed to "Place 6" in "AM, Aug. 4, 2021" fails at "Place 6", the deployment unit 12 deploys the fifth MST 4 to "Place 6" instead of the second MST 4.

Further, for example, when the second MST 4 that has been deployed to "Place 3" in "AM, Aug. 5, 2021" fails, the deployment unit 12 deploys any one of the third to the fifth MSTs 4 to "Place 3" instead of the second MST 4. At this time, the deployment unit 12 typically deploys the closest MST 4 from the third to fifth MSTs to "Place 3" instead of the second MST 4. With this process, the total travel distance when another MST 4 is deployed for backup of the failed MST 4 is the shortest, whereby the deployment cost can be reduced.

The above-mentioned operation server 2 may be realized by a single device, or may be realized by distributed processing by a plurality of devices capable of mutual data communication.

Figure 5:
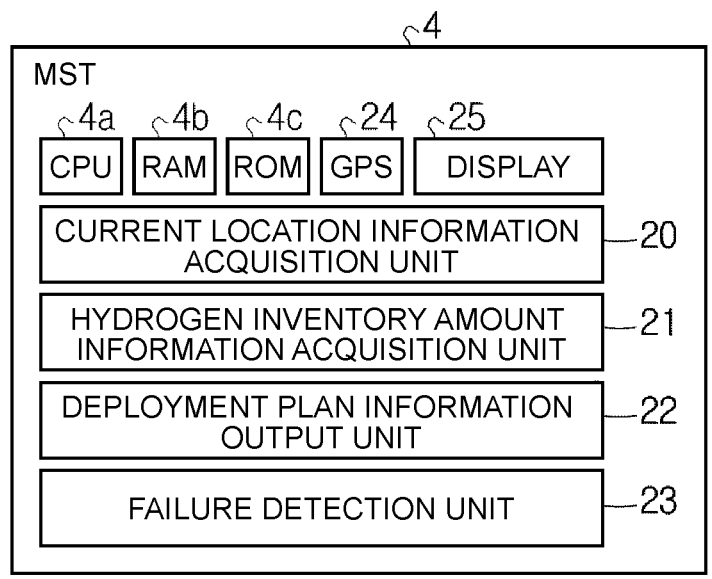
FIG. 5 is a functional block diagram of a mobile hydrogen station.

Next, each MST 4 will be described with reference to FIG. 5. FIG. 5 is a functional block diagram of each MST 4. As shown in FIG. 5, each MST 4 includes a CPU $4a$ as the central arithmetic processor, the RAM $4b$ that is readable and writable, and a ROM $4c$ that is read-only. Then, the CPU $4a$ reads out and executes the control program stored in the ROM $4b$, whereby the control program causes the hardware such as the CPU $4a$ to function as a current location information acquisition unit 20, a hydrogen inventory amount information acquisition unit 21, and a deployment plan information output unit 22, and a failure detection unit 23. Each MST 4 further includes a global positioning system (GPS) module 24 and a display 25.

The current location information acquisition unit 20 acquires the current location information of the MST 4 using the GPS module 24. The GPS module 24 is a specific example of a Global Navigation Satellite System (GNSS) module. Specific examples of the GNSS module include a Global Navigation Satellite System (GLONASS) module, a Galileo module, a BeiDou module, and a Quasi-Zenith Satellite System (QZSS) module. The current location information acquisition unit 20 periodically transmits the acquired current location information to the operation server 2.

The hydrogen inventory amount information acquisition unit 21 acquires hydrogen inventory amount information indicating the hydrogen inventory amount in the hydrogen charging device mounted on the MST 4. Specifically, the hydrogen inventory amount information acquisition unit 21 measures the pressure and temperature in the accumulator of the hydrogen charging device, and calculates the hydrogen inventory amount based on the measurement data. The hydrogen inventory amount information acquisition unit 21 periodically transmits the acquired hydrogen inventory amount information to the operation server 2.

The deployment plan information output unit 22 outputs the deployment plan information received from the operation server 2 to the display 25.

The failure detection unit 23 detects the failure of the MST 4. The failure of the MST 4 is typically a failure of the hydrogen charging device or a failure of the truck on which the MST 4 is mounted. When the failure detection unit 23 detects the failure of the MST 4, the failure detection unit 23 transmits the failure information indicating the failure of the MST 4 to the operation server 2, together with the identification information of the MST 4. The failure information may include information that identifies the failed constituent component among the constituent components of the MST 4.

Figure 6:
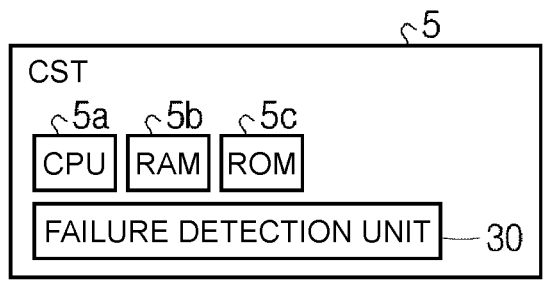
FIG. 6 is a functional block diagram of a stationary hydrogen station.

Next, the CST 5 will be described with reference to FIG. 6. FIG. 6 is a functional block diagram of the CST 5. As shown in FIG. 6, the CST 5 includes a CPU $5a$ as the central arithmetic processor, a RAM $5b$ that is readable and writable, and a ROM $5c$ that is read-only. Then, the CPU $5a$ reads out and executes the control program stored in the ROM $5b$, whereby the control program causes the hardware such as the CPU $5a$ to function as a failure detection unit 30.

The failure detection unit 30 detects the failure of the CST 5. The failure of the CST 5 is typically a failure of the hydrogen charging device. When the failure detection unit 30 detects the failure of the CST 5, the failure detection unit 30 transmits the failure information indicating the failure of the CST 5 to the operation server 2, together with the identification information of the CST 5. The failure information may include information that identifies the failed constituent component among the constituent components of the CST 5.

Figure 7:
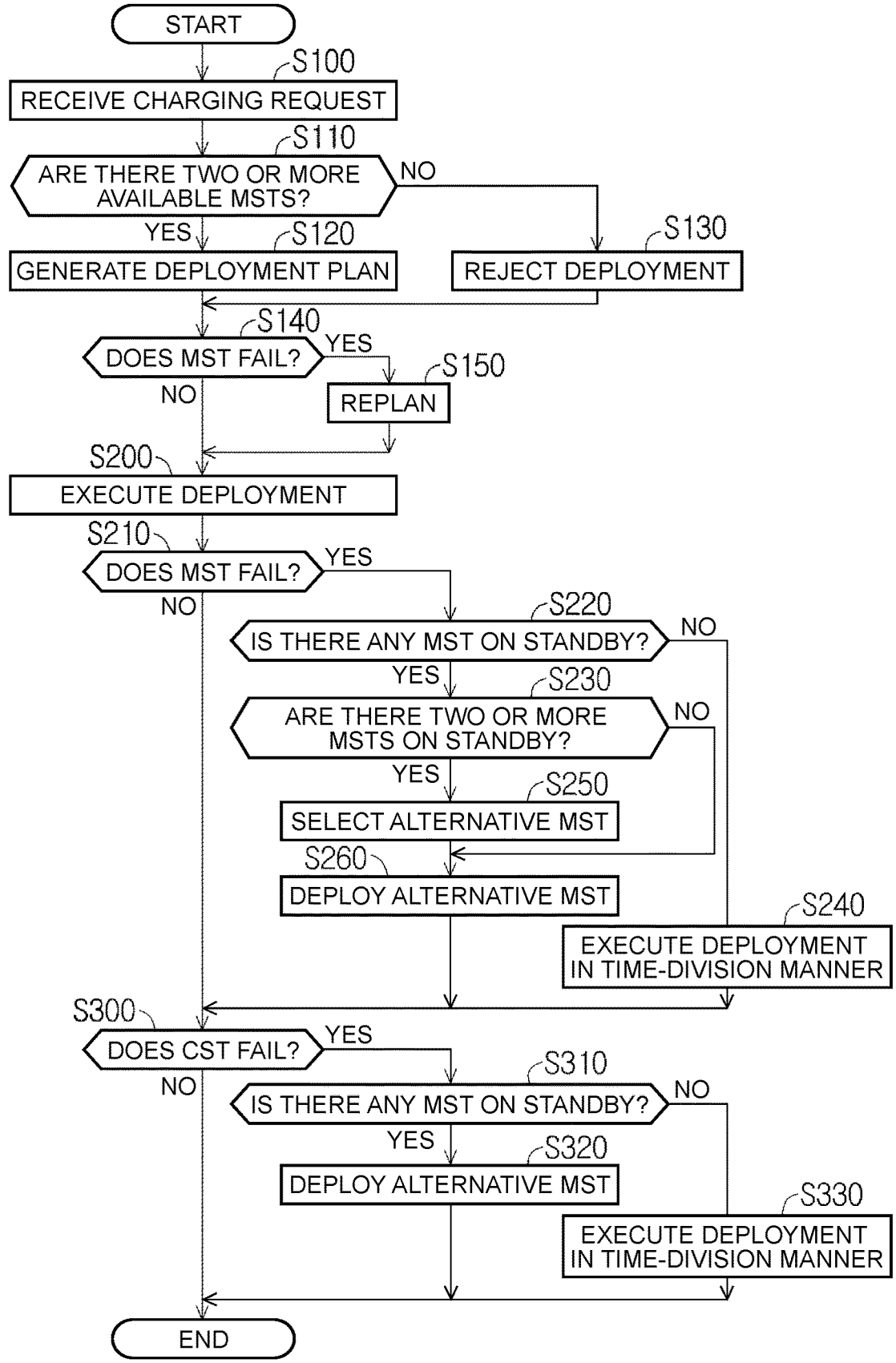
FIG. 7 is a control flow of the operation server.

Next, the operation of the hydrogen supply system 1 will be described with reference to FIG. 7.

The reception unit 10 receives a charging request from each UE 3.

S110: Next, the reception unit 10 refers to the deployment plan information in FIG. 4 and determines whether there are two or more MSTs 4 (available MSTs 4) that are available at the charging date and time specified by the charging request received by the reception unit 10. When there are two or more available MSTs 4, the reception unit 10 advances the process to S120. When there are not two or more available MSTs 4, the reception unit 10 advances the process to S130.

S120: The planning unit 11 generates the deployment plan information for the MSTs 4 based on the charging request received by the reception unit 10, and advances the process to S140.

S130: The reception unit 10 rejects the charging request and transmits a message indicating that the charging request is rejected to the UE 3 that is the transmission source of the charging request. The reception unit 10 then advances the process to S140.

S140: The planning unit 11 determines whether the MST 4 scheduled to be deployed fails. When the planning unit 11 determines that the MST 4 scheduled to be deployed fails, the planning unit 11 advances the process to S150. On the other hand, when the planning unit 11 determines that the MST 4 scheduled to be deployed has not failed, the planning unit 11 advances the process to S200.

S150: When the MST 4 scheduled to be deployed fails, the planning unit 11 replans the deployment of the MSTs 4 and updates the deployment plan information.

For example, when the MST 4 to be deployed fails and there are two or more MSTs 4 that are available at the charging date and time assigned to the failed MST 4 among the MSTs 4, the planning unit 11 updates the deployment plan information such that the MST 4 that is closest to the charging place assigned to the failed MST 4, among the MSTs 4 that are available, in the time slots before and after the charging date and time assigned to the failed MST 4 is deployed instead of the failed MST 4.

In the example shown in FIG. 4, it is assumed that the fourth MST 4 scheduled to be deployed to "Place 1" in "PM, Aug. 6, 2021" fails at midnight on Aug. 5, 2021. Further, the second MST 4 and the third MST 4 are the MSTs that are available in "PM, Aug. 6, 2021" that is the charging date and time assigned to the fourth MST 4. The second MST 4 and the third MST 4 are scheduled to be respectively deployed at "Place 6" and "Place 2" in "AM, Aug. 6, 2021" that is the time slot before "PM, Aug. 6, 2021". Further, "Place 6" is closer to "Place 1" than "Place 2". In this case, the planning unit 11 updates the deployment plan information such that the second MST 4 is deployed at "Place 1" in "PM, Aug. 6, 2021", instead of the fourth MST 4 scheduled to be deployed to "Place 1" in "PM, Aug. 6, 2021". With this process, the deployment cost can be reduced as compared with the case where the third MST 4 is deployed instead.

Further, for example, when the MST 4 scheduled to be deployed fails and none of the MSTs 4 is available at the charging date and time assigned to the failed MST 4, the planning unit 11 updates the deployment plan information such that the MST 4 scheduled to be deployed at another charging place at the charging date and time is also deployed at the charging place assigned to the failed MST 4 in a time-division manner. In this case, a plurality of charging places is assigned to one MST 4 in the same time slot (for example, "PM, Aug. 6, 2021"), and one MST 4 is required to move between the charging places in the time slot. With this process, it is possible to avoid a situation in which the charging request that has been already received needs to be canceled.

S200: The deployment unit 12 executes a deployment process for the MSTs 4 for the day based on the deployment plan information.

S210: The deployment unit 12 determines whether the MST 4 that has been deployed fails. When the deployment unit 12 determines that the MST 4 that has been deployed fails, the deployment unit 12 advances the process to S220. When the deployment unit 12 determines that the MST 4 that has been deployed has not failed, the deployment unit 12 advances the process to S300.

S220: The deployment unit 12 determines whether there is any MST 4 on standby. The MST 4 on standby means the MST 4 that is not currently deployed at any charging place and is standing by until the next deployment schedule. When the deployment unit 12 determines that there is any MST 4 on standby, the deployment unit 12 advances the process to S230. On the other hand, when the deployment unit 12 determines that there is no MST 4 on standby, the deployment unit 12 advances the process to S240.

S230: The deployment unit 12 determines whether there are two or more MSTs 4 on standby. When the deployment unit 12 determines that there are two or more MSTs 4 on standby, the deployment unit 12 advances the process to S250. On the other hand, when the deployment unit 12 determines that there is only one MST 4 on standby, the deployment unit 12 advances the process to S260.

S240: The deployment unit 12 executes the deployment process such that the MST 4 that has been already deployed at another charging place is also deployed at the charging place assigned to the failed MST 4 in a time-division manner. With this process, it is possible to avoid a situation in which the charging request that has been already received needs to be canceled. Then, the deployment unit 12 advances the process to S300.

S250: The deployment unit 12 selects the MST 4 to be deployed instead of the failed MST 4 from the MSTs 4 on standby.

For example, the deployment unit 12 selects the MST 4 closest to the charging place assigned to the failed MST 4 among the MSTs 4 on standby. With this process, the alternative MST 4 can arrive the charging place assigned to the failed MST 4 as soon as possible. In addition, the deployment cost can be reduced.

Alternatively, the deployment unit 12 selects the MST 4 having the largest chargeable amount among the MSTs 4 on standby. With this process, it becomes possible to deploy the MST 4 having an abundant chargeable amount to the charging place assigned to the failed MST 4.

In addition, the deployment unit 12 may select the MST 4 having the lowest operating rate among the MSTs 4 on standby. With this process, it is possible to make the operating rates of the MSTs 4 uniform.

S260: The deployment unit 12 executes the deployment process such that the MST 4 selected from the MSTs 4 on standby is deployed instead of the failed MST 4. Then, the deployment unit 12 advances the process to S300.

S300: Next, the deployment unit 12 determines whether the CST 5 fails. When the deployment unit 12 determines that the CST 5 fails, the deployment unit 12 advances the process to S310. On the other hand, when the deployment unit 12 determines that the CST 5 has not failed, the deployment unit 12 ends the process.

S310: The deployment unit 12 determines whether there is any MST 4 on standby. When the deployment unit 12 determines that there is any MST 4 on standby, the deployment unit 12 advances the process to S320. When the deployment unit 12 determines that there is no MST 4 on standby, the deployment unit 12 advances the process to S330.

S320: The deployment unit 12 executes the deployment process such that the MST 4 on standby is deployed at the place of or near the CST 5. With this process, the charging service in the CST 5 can be continued. Then, the deployment unit 12 ends the process.

Note that, the deployment unit 12 may execute the deployment process such that any one of the MSTs 4 on standby is deployed at the place of or near the failed CST 5 only when there are two or more MSTs 4 on standby. With this process, at least one MST 4 can be left as backup in view of the fact that the MST 4 fails more frequently than the CST 5. However, even when there is only one MST 4 on standby, the deployment unit 12 may execute the deployment process such that the MST 4 is deployed at the place of or near the CST 5.

S330: The deployment unit 12 executes the deployment process such that the MST 4 that has been already deployed at another charging place is also deployed at the place of or near the CST 5 in a time-division manner. With this process, the charging service in the CST 5 can be continued. Then, the deployment unit 12 ends the process.

The preferred embodiment of the present disclosure has been described above, and the above-described embodiment has the following features.

The operation server 2 (operation system) operates the MSTs 4 (mobile hydrogen stations). The operation server 2 includes the reception unit 10 that receives the charging request that specifies at least the charging date and time and the charging place, the planning unit 11 that generates the deployment plan information for the MSTs 4 based on the charging request received by the reception unit 10, and the deployment unit 12 that executes the deployment process for the MSTs 4 based on the deployment plan information. When there are not two or more MSTs 4 that are available at the charging date and time specified by the charging request, the reception unit 10 rejects the charging request. That is, when the MST 4 that has been deployed or is scheduled to be deployed fails, the deployment unit 12 executes the deployment process such that the MST 4 that is available at the charging date and time assigned to the failed MST 4 is deployed instead of the failed MST 4, among the MSTs 4. With the configuration above, an operation technique capable of handling the failure of MST 4 is realized.

That is, when the MST 4 that has been deployed fails and there are two or more MSTs 4 on standby, the deployment unit 12 executes the deployment process such that the MST 4 that is closest to the charging place assigned to the failed MST 4 is deployed instead of the failed MST 4, among the MSTs 4 on standby. With the configuration above, the deployment cost can be reduced.

That is, when the MST 4 that has been deployed or is scheduled to be deployed fails and there are two or more MSTs 4 on standby, the deployment unit 12 executes the deployment process such that the MST 4 having the largest chargeable amount is deployed instead of the failed MST 4, among the MSTs 4 on standby. With the configuration above, the MST 4 having an abundant chargeable amount is deployed to the charging place assigned to the failed MST 4.

When the MST 4 that has been deployed fails and none of the MSTs 4 is on standby, the deployment unit 12 executes the deployment process such that the MST 4 that has been deployed at another charging place is also deployed at the charging place assigned to the failed MST 4 in a time-division manner. With the configuration above, the charging service at the charging place can be continued without canceling the charging request that has already been received.

When the MST 4 scheduled to be deployed fails and there are two or more MSTs 4 that are available at the charging date and time assigned to the failed MST 4, the planning unit 11 updates the deployment plan information such that the MST 4 that is closest to the charging place assigned to the failed MST 4 in the time slots before and after the charging date and time assigned to the failed MST 4, among the MSTs 4 that are available. With the configuration above, the deployment cost can be reduced.

When the MST 4 scheduled to be deployed fails and none of the MSTs 4 is available at the charging date and time assigned to the failed MST 4, the planning unit 11 updates the deployment plan information such that the MST 4 scheduled to be deployed at another charging place at the charging date and time is also deployed at the charging place assigned to the failed MST 4 in a time-division manner. With the configuration above, the charging service at the charging place can be continued without canceling the charging request that has already been received.

The hydrogen supply system 1 also operates the CST 5 (stationary hydrogen station). The deployment unit 12 executes the deployment process such that the MST 4 on standby is deployed at the place of or near the CST 5 when the CST 5 fails. With the configuration above, the charging service in the CST 5 can be continued.

An operation method to operate the MSTs 4 includes a reception step (S100) of receiving the charging request that specifies at least the charging date and time and the charging place, a planning step (S120) of generating the deployment plan information for the MSTs 4 based on the charging request received by the reception unit 10, and a deployment step (S200) of executing the deployment process for the MSTs 4 based on the deployment plan information. In the reception step, when there are not two or more MSTs 4 that are available at the charging date and time specified by the charging request, the charging request is rejected (S130). In the deployment step, when the MST 4 that has been deployed or is scheduled to be deployed fails, the deployment process is executed such that the MST 4 that is available at the charging date and time assigned to the failed MST 4 is deployed instead of the failed MST 4 is executed, among the MSTs 4 (S150). With the method above, the operation technique capable of handling the failure of MST 4 is realized.

Note that, when none of the MSTs 4 is on standby, the deployment unit 12 may temporarily requests deployment of the mobile hydrogen station from the hydrogen supply system installed in the neighboring administrative division.

Further, the chargeable amount that can be charged by one MST 4 is finite. Therefore, when there is a plurality of charging requests at the same charging date and time at the same charging place, the charging request may be rejected in the case where the charging amount specified in a new charging request exceeds the remaining chargeable amount of the MST 4.

In the examples described above, the program can be stored using various types of non-transitory computer-readable media and supplied to a computer. The non-transitory computer-readable media include various types of tangible storage media. Examples of non-transitory computer-readable media include magnetic recording media (e.g., flexible disks, magnetic tapes, hard disk drives), magneto-optical recording media (e.g., magneto-optical disks). Examples of non-transitory computer-readable media further include compact disc read-only memories (CD-ROMs), compact disc-recordable discs (CD-Rs), compact disc-rewritable discs (CD-R/Ws), and semiconductor memories (e.g., mask ROMs). Examples of non-transitory computer-readable media further include programmable ROMs (PROMs), erasable PROMs (EPROMs), flash ROMs, and random access memories (RAMs). Further, the program may also be supplied to the computer by various types of transitory computer-readable media. Examples of transitory computer-readable media include electrical and optical signals and electromagnetic waves. The transitory computer-readable media can supply a program to a computer via a wired communication path such as an electric wire and an optical fiber, or a wireless communication path.

What is claimed is:

1. An operation system that operates a plurality of mobile hydrogen stations, the operation system comprising:
    a memory; and
    a processor connected to the memory, the processor configured to include:
        a reception unit that receives a charging request that specifies at least a charging date and time and a charging place;
        a planning unit that generates deployment plan information for the mobile hydrogen stations based on the charging request received by the reception unit; and
        a deployment unit that executes a deployment process for the mobile hydrogen stations based on the deployment plan information, wherein:
    when there are not two or more of the mobile hydrogen stations that are available at the charging date and time specified by the charging request, the reception unit rejects the charging request; and
    when the mobile hydrogen station that has been deployed or is scheduled to be deployed fails, the deployment unit executes the deployment process such that the mobile hydrogen station that is available at the charging date and time assigned to a failed mobile hydrogen station is deployed instead of the failed mobile hydrogen station, among the mobile hydrogen stations.

2. The operation system according to claim 1, wherein when the mobile hydrogen station that has been deployed fails and there are two or more of the mobile hydrogen stations on standby, the deployment unit executes the deployment process such that the mobile hydrogen station that is closest to the charging place assigned to the failed mobile hydrogen station is deployed instead of the failed mobile hydrogen station, among the mobile hydrogen stations on standby.

3. The operation system according to claim 1, wherein when the mobile hydrogen station that has been deployed fails and there are two or more of the mobile hydrogen stations on standby, the deployment unit executes the deployment process such that the mobile hydrogen station having a largest chargeable amount is deployed instead of the failed mobile hydrogen station, among the mobile hydrogen stations on standby.

4. The operation system according to claim 1, wherein when the mobile hydrogen station that has been deployed fails and none of the mobile hydrogen stations is on standby, the deployment unit executes the deployment process such that the mobile hydrogen station that has been deployed at another charging place is also deployed at the charging place assigned to the failed mobile hydrogen station in a time-division manner.

5. The operation system according to claim 1, wherein when the mobile hydrogen station scheduled to be deployed fails and there are two or more of the mobile hydrogen stations that are available at the charging date and time assigned to the failed mobile hydrogen station, the planning unit updates the deployment plan information such that the mobile hydrogen station that is closest to the charging place assigned to the failed mobile hydrogen station in time slots before and after the charging date and time assigned to the failed mobile hydrogen station is deployed instead of the failed mobile hydrogen station, among the mobile hydrogen stations that are available.

6. The operation system according to claim 1, wherein when the mobile hydrogen station scheduled to be deployed fails and none of the mobile hydrogen stations is available at the charging date and time assigned to the failed mobile hydrogen station, the planning unit updates the deployment plan information such that the mobile hydrogen station scheduled to be deployed at another charging place at the charging date and time is also deployed at the charging place assigned to the failed mobile hydrogen station in a time-division manner.

7. The operation system according to claim 1, wherein:
the operation system further operates a stationary hydrogen station; and
when the stationary hydrogen station fails, the deployment unit executes the deployment process such that the mobile hydrogen station on standby is deployed at a place of or near the stationary hydrogen station.

8. An operation method for operating a plurality of mobile hydrogen stations, the operation method comprising:
a reception step of receiving a charging request that specifies at least a charging date and time and a charging place;
a planning step of generating deployment plan information for the mobile hydrogen stations based on the received charging request; and
a deployment step of executing a deployment process for the mobile hydrogen stations based on the deployment plan information, wherein:
in the reception step, when there are not two or more of the mobile hydrogen stations that are available at the charging date and time specified by the charging request, the charging request is rejected; and
in the deployment step, when the mobile hydrogen station that has been deployed or is scheduled to be deployed fails, the deployment process is executed such that the mobile hydrogen station that is available at the charging date and time assigned to a failed mobile hydrogen station is deployed instead of the failed mobile hydrogen station, among the mobile hydrogen stations.

9. The operation method according to claim 8, wherein when the mobile hydrogen station that has been deployed fails and there are two or more of the mobile hydrogen stations on standby, executing the deployment process such that the mobile hydrogen station that is closest to the charging place assigned to the failed mobile hydrogen station is deployed instead of the failed mobile hydrogen station, among the mobile hydrogen stations on standby.

10. The operation method according to claim 8, wherein when the mobile hydrogen station that has been deployed fails and there are two or more of the mobile hydrogen stations on standby, executing the deployment process such that the mobile hydrogen station having a largest chargeable amount is deployed instead of the failed mobile hydrogen station, among the mobile hydrogen stations on standby.

11. The operation method according to claim 8, wherein when the mobile hydrogen station that has been deployed fails and none of the mobile hydrogen stations is on standby, executing the deployment process such that the mobile hydrogen station that has been deployed at another charging place is also deployed at the charging place assigned to the failed mobile hydrogen station in a time-division manner.

12. The operation method according to claim 8, wherein when the mobile hydrogen station scheduled to be deployed fails and there are two or more of the mobile hydrogen stations that are available at the charging date and time assigned to the failed mobile hydrogen station, updating the deployment plan information such that the mobile hydrogen station that is closest to the charging place assigned to the failed mobile hydrogen station in time slots before and after the charging date and time assigned to the failed mobile hydrogen station is deployed instead of the failed mobile hydrogen station, among the mobile hydrogen stations that are available.

13. The operation method according to claim 8, wherein when the mobile hydrogen station scheduled to be deployed fails and none of the mobile hydrogen stations is available at the charging date and time assigned to the failed mobile hydrogen station, updating the deployment plan information such that the mobile hydrogen station scheduled to be deployed at another charging place at the charging date and time is also deployed at the charging place assigned to the failed mobile hydrogen station in a time-division manner.

14. The operation method according to claim 8, wherein:
the operation method further operates a stationary hydrogen station; and
when the stationary hydrogen station fails, executing the deployment process such that the mobile hydrogen station on standby is deployed at a place of or near the stationary hydrogen station.

15. A non-transitory computer-readable storage medium storing instructions executable by a processor to perform processing to operate a plurality of mobile hydrogen stations, comprising:
a reception step of receiving a charging request that specifies at least a charging date and time and a charging place;

a planning step of generating deployment plan information for the mobile hydrogen stations based on the received charging request; and a deployment step of executing a deployment process for the mobile hydrogen stations based on the deployment plan information, wherein:

in the reception step, when there are not two or more of the mobile hydrogen stations that are available at the charging date and time specified by the charging request, the charging request is rejected; and in the deployment step, when the mobile hydrogen station that has been deployed or is scheduled to be deployed fails, the deployment process is executed such that the mobile hydrogen station that is available at the charging date and time assigned to a failed mobile hydrogen station is deployed instead of the failed mobile hydrogen station, among the mobile hydrogen stations.

* * * * *